US005712015A

United States Patent [19]

Guillem

[11] Patent Number: 5,712,015

[45] Date of Patent: Jan. 27, 1998

[54] FILLING BODY

[75] Inventor: Jose Guillem, Valencia, Spain

[73] Assignee: Illbruck GmbH, Leverkusen, Germany

[21] Appl. No.: 432,226

[22] Filed: May 1, 1995

[30] Foreign Application Priority Data

May 6, 1994 [ES] Spain .............................. 9401240 U

[51] Int. Cl.⁶ ......................... B29C 67/22; G10K 11/16

[52] U.S. Cl. ......................... 428/70; 428/34.3; 428/34.9; 428/35.2; 428/71; 428/72

[58] Field of Search ............................ 428/304.4, 314.2, 428/34.3, 34.9, 35.2, 70, 71, 72

[56] References Cited

FOREIGN PATENT DOCUMENTS 2267553 12/1993 United Kingdom .
8804621 6/1988 WIPO .
9311001 6/1993 WIPO .

*Primary Examiner*—Richard Weisberger
*Attorney, Agent, or Firm*—Martin A. Farber

[57] ABSTRACT

A filling body (1) for introduction into a hollow space of an automobile body, consisting of a foam filling material which is surrounded by a plastic film (2), the foam filling material being adapted to be reduced in size, for example, by an evacuation of the hermetically closing covering for introduction into the hollow space and being adapted to be held fast in the hollow space by a release of restoring forces of the foam filling material, the foam filling material having foam flakes 5, 5'. In order to obtain as good as possible a variability—awkward—with respect to the geometrical shaping and the best possible filling of complicated, for instance angular geometries of the hollow space when the restoring forces are released, the foam material consist exclusively of foam flakes (5, 5') and the filling body (1) is permanently deformable as a result of the foam flakes (5, 5') which are held together merely by a shaping action of the plastic film, in the evacuated state by a displacement of the foam flakes (5, 5') which can be obtained on the basis of external action.

14 Claims, 3 Drawing Sheets

FILLING BODY

FIELD AND BACKGROUND OF THE INVENTION

The present invention relates to a filling body which is to be introduced into a hollow space in an automobile body, it comprising a foam filling material which is surrounded by a plastic film, the foam filling material being reducible in size by, for instance, compression by atmospheric pressure upon evacuation of the hermetically closed wrapping in order to be introduced into the hollow space, and being fixed in the hollow space by release of the restoring forces of the foam filling material.

Various embodiments of such filling bodies foam types are already known. Reference is made, for instance, to Federal Republic of Germany OS 35 06 004. Reference is also made to Federal Republic of Germany OS 39 40 707, Federal Republic of Germany Utility Model 87 07 140, Federal Republic of Germany OS 39 40 707, as well as Federal Republic of Germany Patent 40 28 895. In addition to evacuation of the plastic covering, it is also possible to decrease the size of the foam filling material from the outside by pressure compressing, in which case the wrapping is not hermetically closed.

Such reduced-size or evacuated filling bodies are inserted into a hollow space of a automobile body in order, for instance to act as noise-damping member there. After its insertion, and possibly only after passage through a painting station, the compression of the foam material is eliminated or a vent opening is developed in the covering. The restoring forces of the elastically restoring foam filling material then effect an increase in the volume of the filling body, as a result of which it is secured in the hollow space into which it has been introduced. Further anchoring is generally not necessary.

In the case of the known filling bodies, for example a filling body in accordance with Federal Republic of Germany A1 35 06 004, the foam filling material consists of a coherent block of open-cell foam. By the evacuation, this block is reduced in size substantially geometrically to itself. After elimination of the evacuation or other compression, the foam body moves back again so that its initial dimensions are then substantially restored.

There is a need for, and it is an object of the invention to provide, a filling body of this type which is variable with respect to its geometrical shape and which, upon release of the restoring forces, again substantially fills out even complicated, for instance angular, geometries of the hollow space into which it has been introduced.

In accordance with the invention the flakes of foam are held together merely by the shaping action of the plastic film, whereby the filling body can be permanently deformed by a displacement of the flakes of foam with respect to each other as the result of external action. In accordance with the invention, the foam filling material is made of a foam-flake material, the flakes of foam being introduced, insofar as possible without a binder, in a loose pile into the covering. Such a foam filling material which consists solely of flakes of foam not only has advantageous restoring properties since the local restoring of the foam flakes is not prevented by attachment to neighboring parts of the foam material, but it is also advantageous due to the fact that deformability can be obtained as a result of a displacement of the foam flakes with respect to each other, which can be obtained as the result of an external force, in the evacuated state. For example, in the case of an elongated filling body, of, for instance, bar shape, the result can be obtained that the filling body is imparted by bending a curvature which permits easier insertion into, for instance, curved hollow spaces. Furthermore, the filling body can also, for instance, be twisted around its longitudinal axis. The first deforming of the evacuated filling member described above leads accordingly to a change in the center axis of the shaped body. For example, a long straight central axis becomes, as described, a curved central axis. It is of importance, however, that a deformation which is imparted, for instance, in the manner described above be done away with upon elimination of the evacuation. In another advantageous embodiment, it is provided that the foam flakes are made in part of closed-cell foam. In this case, however, it is also preferred that the foam flakes of closed-cell foam constitute a smaller percentage of the foam filling material. The foam flakes of closed-cell foam can, for instance, also be used for the shaping of a minimum cross section of the evacuated filling body, since these portions of the foam flakes are compressed less strongly or scarcely at all as compared with the foam flakes of open-cell foam. Since, furthermore, in the case of such a filling body, the covering in the form of a plastic film exerts a shaping action, since otherwise, at least in the case of elongated filling bodies, a kinking could, for instance, occur, or else, in the case of large-size filling bodies, a baglike development might be produced, it is desirable for the plastic film to have a thickness which is sufficient for this. For example, a thickness of 20 to 100 μm and preferably 30 to 80 μm and even more preferably 75 μm or 40 μm.

BRIEF DESCRIPTION OF THE DRAWINGS

With the above and other objects and other advantages in view, the present invention will become more clearly understood in connection with the detailed description of a preferred embodiment, when considered with the accompanying drawings of which.

DETAILED DESCRIPTION OF THE PREFERRED EMBODIMENT

Figure 1:
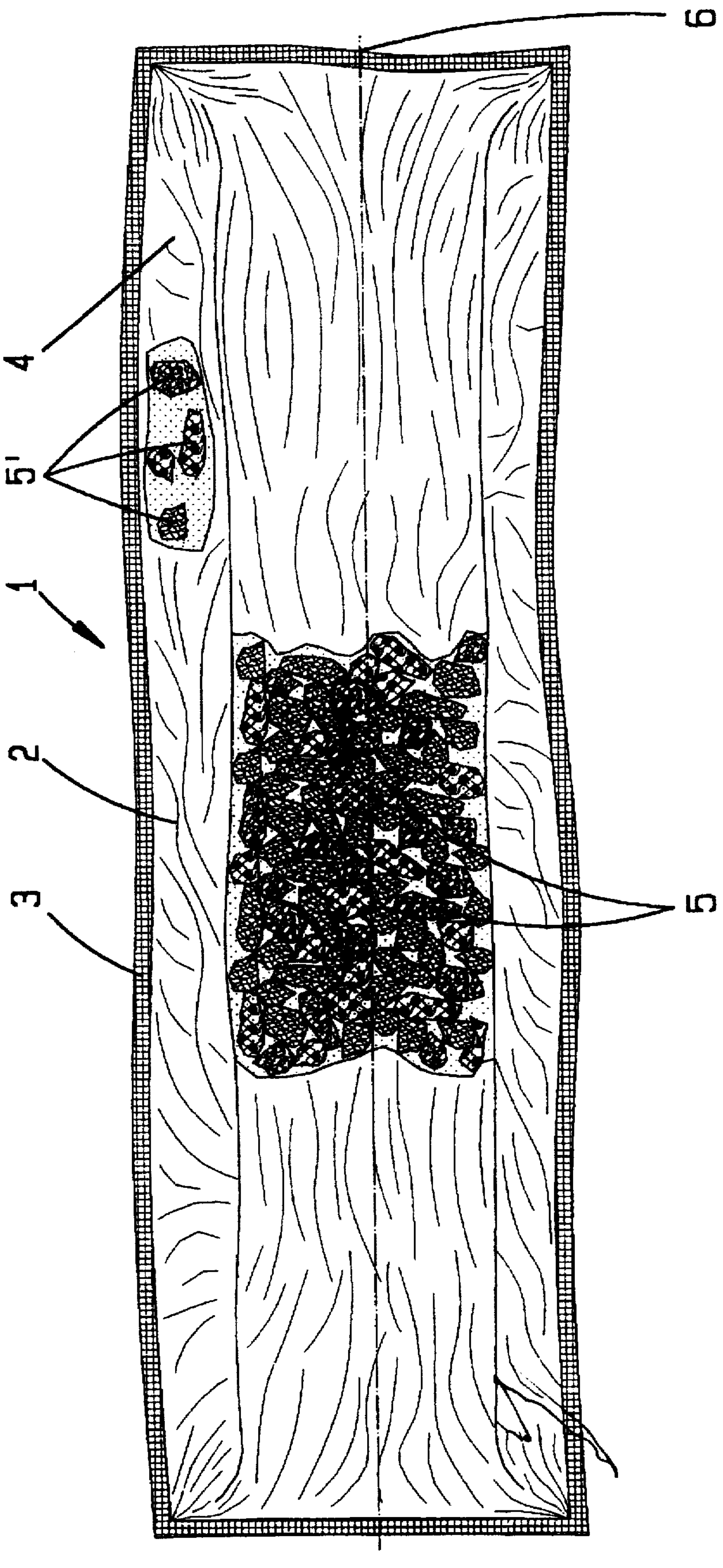
FIG. 1 is a top view of an evacuated filling body.

Referring to FIG. 1 there is shown and described a filling body 1 having a covering 2 which is made of a plastic film. The two-layer plastic film 2, which is made of an upper layer and a lower layer is welded (sealed) together in its peripheral edge region 3. Flakes of foam are enclosed between the layers of the plastic film 2 which constitute an hermetically closed covering of the flakes. In evacuated condition—see in this connection also FIG. 4—the layers of the plastic film 2 do not lie against each other solely in the edge region 3 but, furthermore, also over a substantial region 4.

A plurality of foam flakes 5 are present in compressed form in evacuated state in a central region of the filling body. The foam flakes are introduced as a loose pile into the covering and accordingly do not adhere to each other. As a result of this loose pile, however, there is obtained—as a rule in individualized form—an arrangement of foam flakes 5' outside the central region, they, as a rule, being held together practically immovably in the evacuated state in one or two layers directly between the upper and lower layers of the plastic film 2.

Such a filling body is introduced in known manner, for instance, into the hollow space of an automobile body. In detail, reference is had with regard to this to the literature cited at the beginning hereof. After introduction into this hollow space, the compressing, i.e. the evacuation in the present case, is done away with, so that the restoring forces of the foam flakes 5, 5' are released.

The foam filling material is made exclusively of foam flakes 5, 5'. These foam flakes 5, 5' are made preferably of open-cell foam, but individual foam flakes 5, 5', or a certain—preferably smaller—proportion of the foam flakes 5, 5' may also be made of closed-cell foam. The foam flakes are preferably of a size of between 0.5 and 2 cm in their greatest length and between 0.5 and 1 cm in their greatest width.

Figure 2:
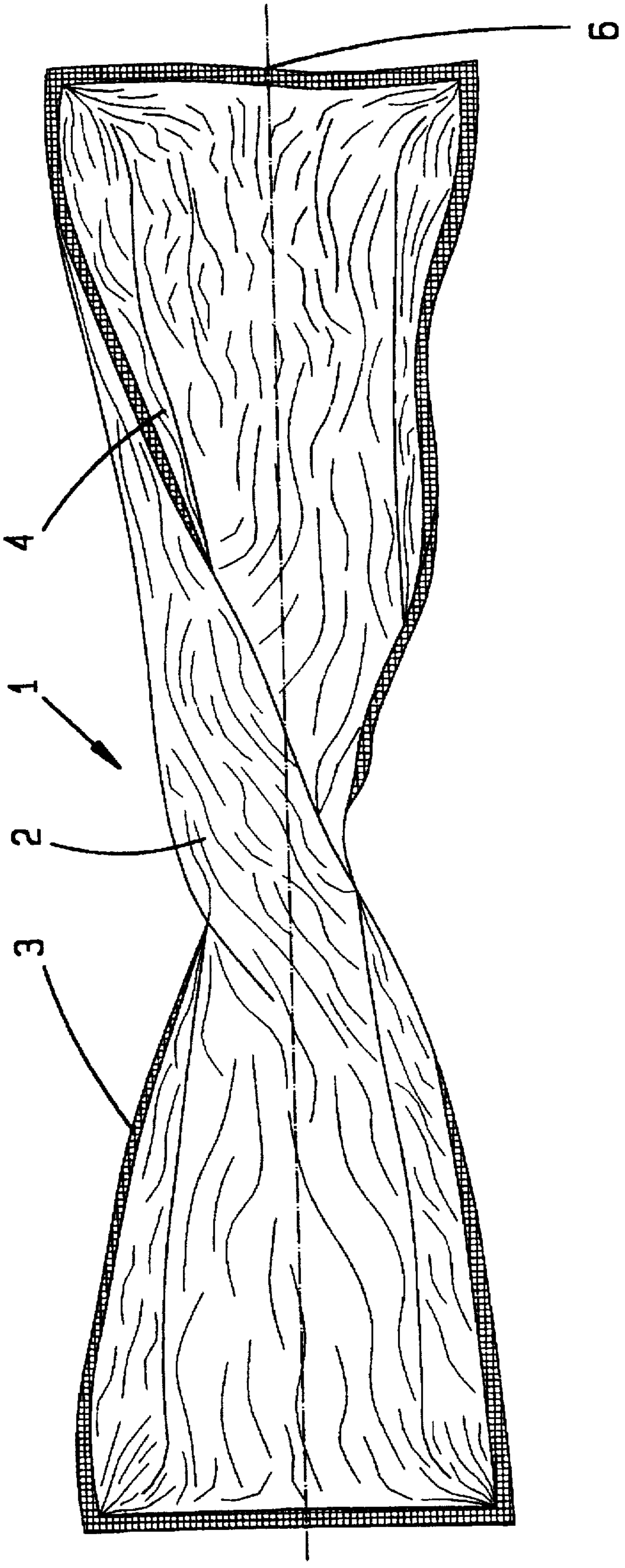
FIG. 2 shows the filling body of FIG. 1 in a twisted state.
Figures 3, 4:
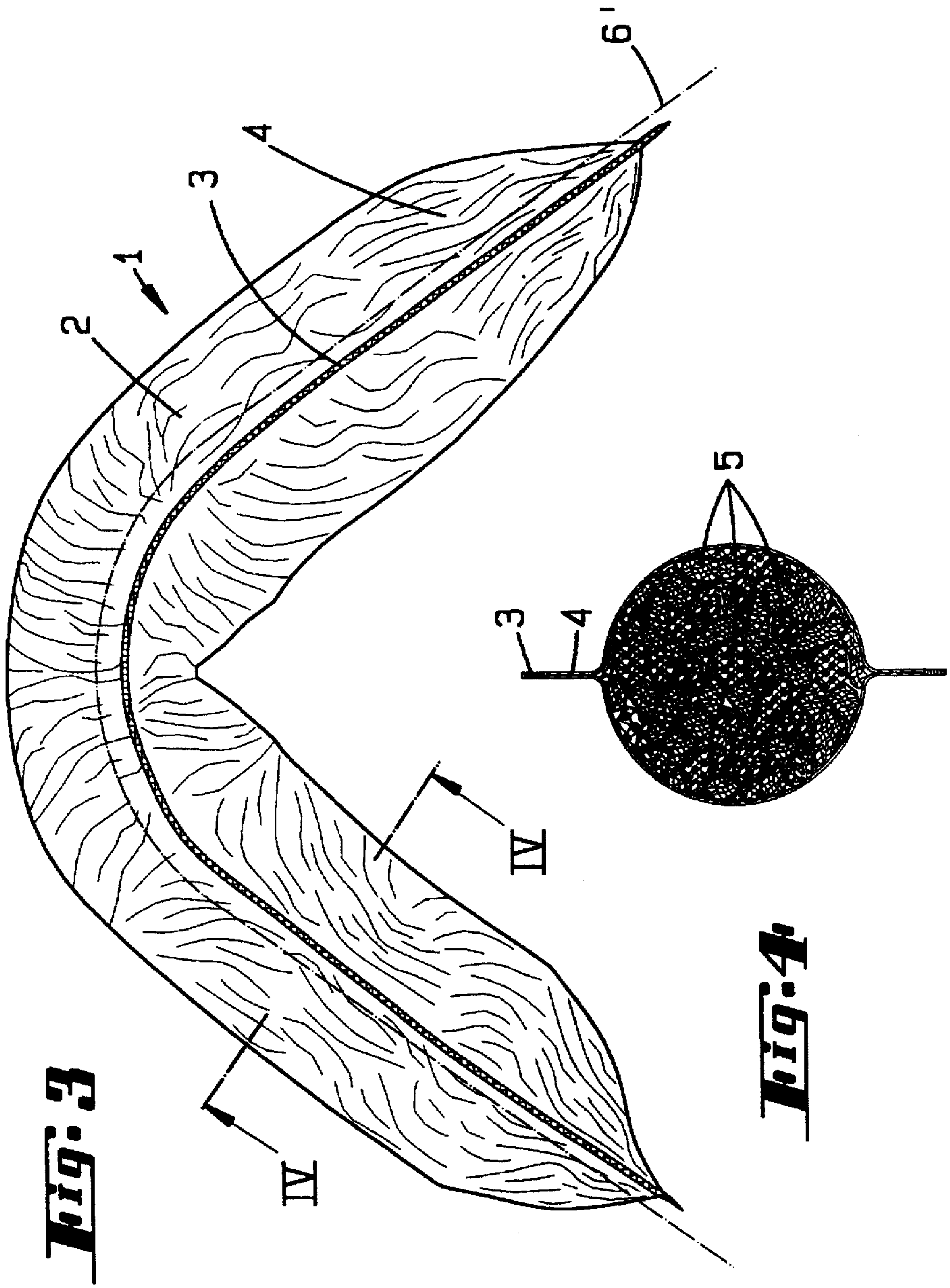
FIG. 3 shows the filling body of FIG. 1 in a bent state.
FIG. 4 is a cross section through the object of FIG. 3 along the line IV—IV.

In evacuated condition, as shown in FIG. 1 and furthermore in FIGS. 2 and 3, it is now possible, due to the piled loose arrangement of the foam flakes 5, 5' to effect a twisting of the filling body 1, as shown in FIG. 2, in which connection a permanent twist can be obtained. In addition to this, it is, in particular, also possible as shown in FIG. 3 to obtain a permanent bend of the filling body, in which case a longitudinal axis 6 which extends substantially straight in the object shown in FIG. 1 can be converted into a curved longitudinal axis 6'.

I claim:

1. A filling body for introduction into a hollow space in an automobile body, comprising a polymeric foam filling material which is surrounded by a plastic film, the foam filling material being reduceable in size for introduction into the hollow space and being adapted to be held fast in the hollow space by a release of restoring forces of the foam filling material, the foam filling material having flakes of foam which are displaceable relative to each other wherein the foam filling material comprises exclusively the flakes of foam, the flakes having a length of less than approximately 2 cm and a width of less than approximately 1 cm; and wherein the filling body, as a result of the foam flakes which are held together merely by a shaping action of the plastic film can be permanently deformed in an evacuated condition by a displacement of the flakes of foam with respect to each other, which displacement can be obtained by means of external action.

2. A filling body according to claim 1, wherein a central axis of the filling body can be changed by the permanent deformation.

3. A filling body according to claim 1, wherein the flakes of foam comprise in part closed-cell foam.

4. A filling body according to claim 3, wherein a first portion of the flakes of foam are of open-cell foam, and a second portion of the flakes of foam are of closed-cell foam, the second portion being less than the first portion.

5. A filling body according to claim 1, wherein the plastic film has a thickness of 20 μm to 100 μm.

6. A filling body according to claim 1, wherein in the evacuated condition, in addition to a central accumulation of various ones of the flakes of foam, other ones of the flakes of foam are also compressed individually between walls of the film.

7. A filling body according to claim 1, wherein the plastic film is an hermetically closed covering which is evacuatable so as to effect the size reduction of the foam filling material.

8. A filling body according to claim 1, wherein the flakes of foam have an approximate range of length from 0.5 cm to 2 cm and an approximate range of width from 0.5 cm to 1 cm.

9. A filling body for introduction into a hollow space in an automobile body, comprising a polymeric foam filling material which is surrounded by a plastic film, the foam filling material being reduceable in size by compression for introduction into the hollow space and being adapted to be held fast in the hollow space by a release of restoring forces on the foam filling material, the foam filling material comprises exclusively flakes of foam which are displaceable relative to each other, the flakes having a length of less than approximately 2 cm and a width of less than approximately 1 cm; and wherein the filling body, as a result of the foam flakes which are held together merely by shaping action of the plastic film, can be deformed in a compressed condition by a displacement of the flakes of foam with respect to each other, which displacement can be obtained by means of external action.

10. A filling body according to claim 9, wherein the compression is effected by evacuation of air from the plastic film, the latter being an hermetically closed covering.

11. A filling body according to claim 1, wherein the foam flakes are flakes introduced into the plastic film in a loose pile.

12. A filling body according to claim 9, wherein the foam flakes are flakes introduced into the plastic film in a loose pile.

13. The filling body according to claim 1, wherein the flakes are in a range of substantially 0.5 to 2 cm in their greatest length and in a range of substantially 0.5 to 1 cm in their greatest width.

14. The filling body according to claim 9, wherein the flakes are in a range of substantially 0.5 to 2 cm in their greatest length and in a range of substantially 0.5 to 1 cm in their greatest width.

* * * * *